Jan. 13, 1925.
R. E. LANGE
1,522,959
COMBINATION FENDER BRACE AND BUMPER
Filed Aug. 27, 1924     2 Sheets-Sheet 1
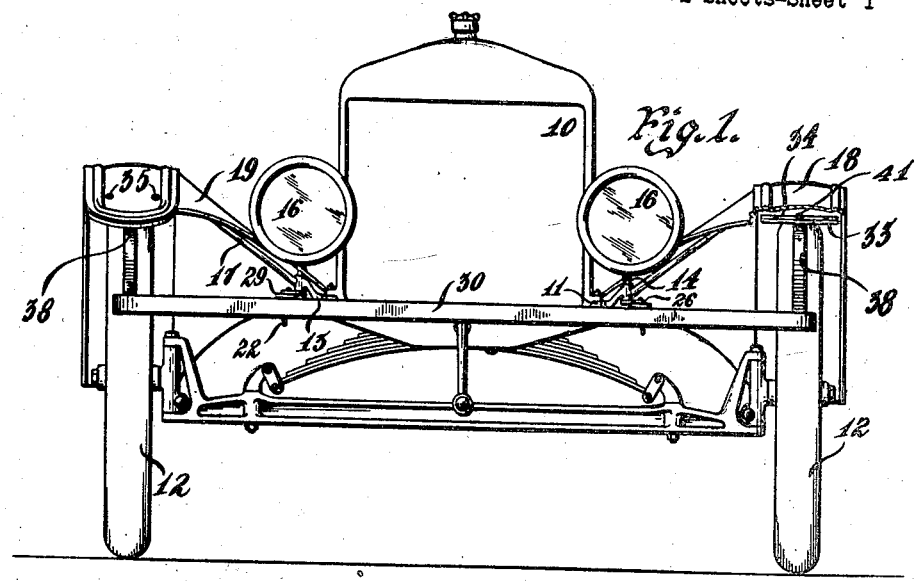
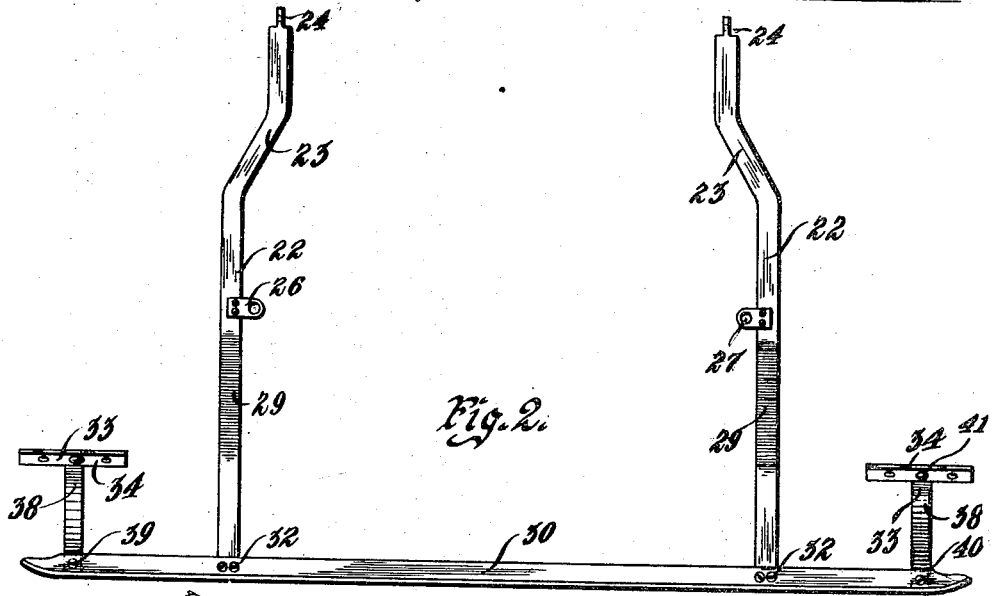
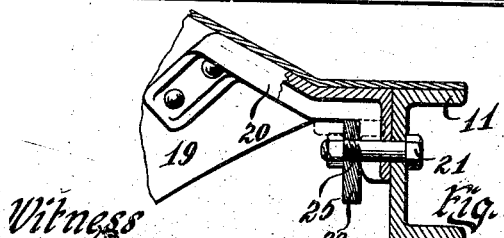
Witness
Inventor
Reinhold E. Lange
by Bair & Freeman Attorneys

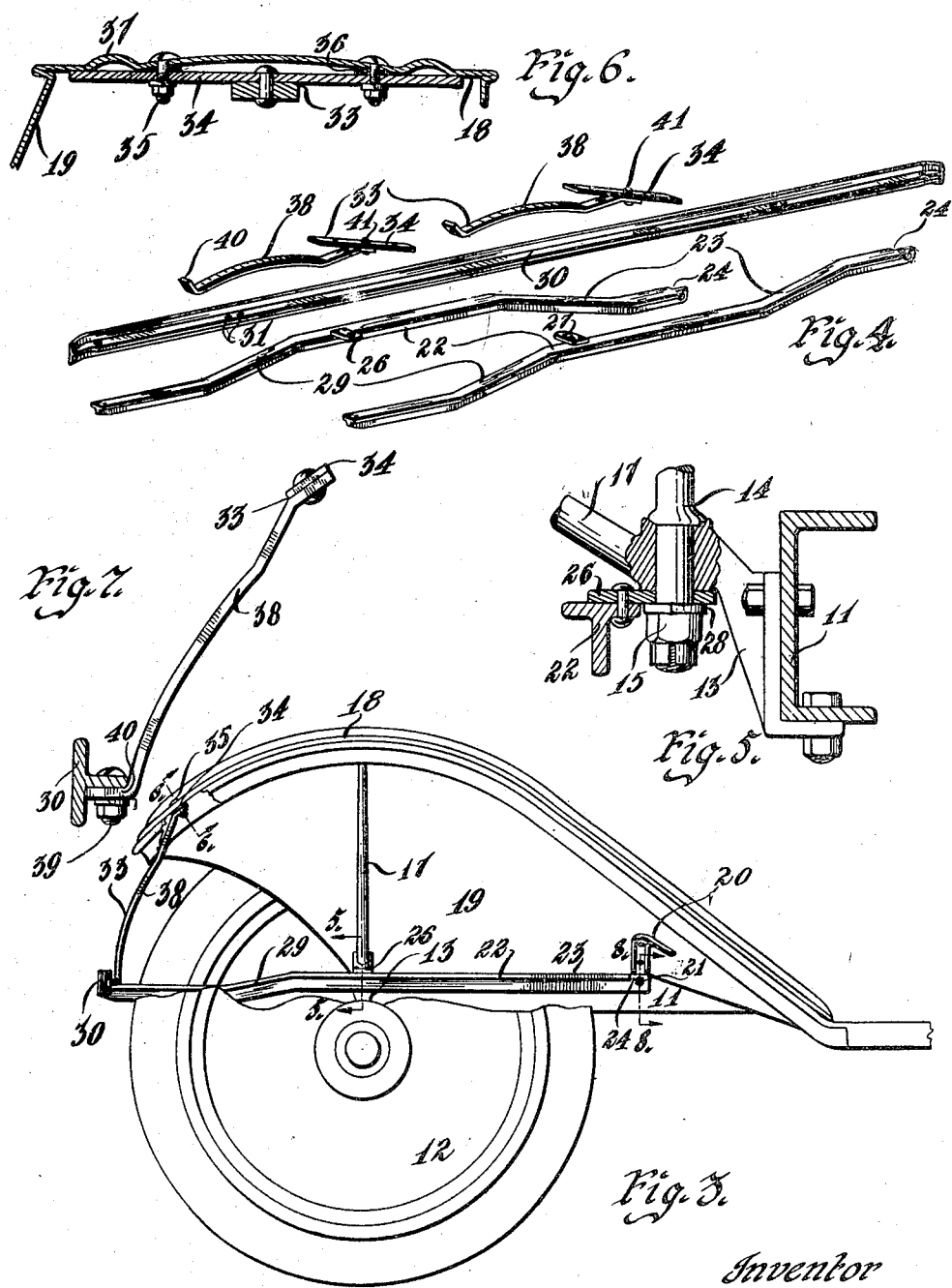

Patented Jan. 13, 1925.

1,522,959

UNITED STATES PATENT OFFICE.

REINHOLD E. LANGE, OF ST. PAUL, MINNESOTA, ASSIGNOR TO ALVAH H. WARREN, JR., OF ST. PAUL, MINNESOTA.

COMBINATION FENDER BRACE AND BUMPER.

Application filed August 27, 1924. Serial No. 734,437.

*To all whom it may concern:*

Be it known that I, REINHOLD E. LANGE, a citizen of the United States, residing at St. Paul, in the county of Ramsey and State of Minnesota, have invented a certain new and useful Combination Fender Brace and Bumper, of which the following is a specification.

This invention relates to an improvement in combination fender brace and bumper structures, which can be manufactured and marketed at a nominal cost.

An object of my invention is to provide a combined fender brace and bumper structure, wherein the chassis of the automobile will be connected to the fenders in such manner as will prevent vibration of the fenders either vertically or laterally relative to the chassis at a place where the fender is ordinarily subjected to such vibration, and at the same time to provide a bumper bar which braces the fenders and connects them together.

In this connection, it may be mentioned that my present combination fender brace and bumper is especially applicable for Ford automobiles for bracing the front fenders thereof.

Still a further object is to provide a connection between the bumper bar and the fenders, which will thoroughly brace the fenders against movement, the connection being secured to the particular fender near each of its side edges so as to secure a better bearing or fastening to the fender.

Still a further object is to provide a fastening between the bumper and the fenders which is T-shaped and arranged with two parts pivotally connected together, whereby the parts can be arranged at right angles to each other when ready for use, and arranged in substantial alignment when not in use for convenience in shipping and packing.

Still a further object is to provide a combination fender brace and bumper which can be secured in position on an automobile as a complete unit without distorting any parts of the automobile, and taking advantage of certain portions of the automobile which are standard equipment.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a front elevation of an automobile with my improved combination fender brace and bumper secured thereto, parts being broken away to better illustrate the construction thereof.

Figure 2 is a top, plan view of my combination fender brace and bumper.

Figure 3 is a side view of a portion of an automobile with my structure attached thereto.

Figure 4 is a perspective view of the several parts in disassembled position, which form my complete structure.

Figure 5 is a detail, sectional view taken on the line 5—5 of Figure 3, showing one of the fastenings between the automobile itself and my structure.

Figure 6 is a detail, sectional view taken on line 6—6 of Figure 3 showing the connection between the fastening strap and the fender.

Figure 7 is a side view of the strap connection between the bumper bar and the fender; and Figure 8 is a detail, sectional view taken on line 8—8 of Figure 3 showing the rear connection between the supporting arms of the combination fender brace and bumper and the automobile chassis.

In the embodiment of my invention shown in the accompanying drawings, I have used the reference numeral 10 to indicate generally an automobile, which includes a chassis 11 and wheels 12.

Secured to the chassis 11 near the forward end thereof at one side is a lamp bracket support 13. The lamp bracket support has mounted thereon a vertical spindle 14 having a nut 15 on its lower screw threaded end.

Headlights 16 are mounted on the lamp spindles 14.

The bracket 13 also has an upward and outward extension 17 thereon, which braces the fenders 18 of the automobile.

The parts just described are of the conventional form used upon Ford makes of automobiles.

The fenders proper 18 are connected to the automobile body or chassis by fender aprons 19. The fender aprons 19 are supported somewhat by brackets 20 bolted to the chassis 11 by the bolts 21.

My improved combination fender brace structure includes a pair of combined supporting and connecting arms 22, which as shown in the drawings, are formed of T irons. The arms 22 are spaced apart and are designed to rest partially against each side of the chassis 11 and to project forwardly therefrom.

The arms 22 are formed with offset portions 23 so that the outer free ends of the arms are spaced somewhat further apart than the width of the chassis itself.

The purpose of providing this offset portion is to permit the arms 22 to be connected to parts of the permanent equipment of the automobile, as will hereinafter be more fully set forth.

The flanged parts of the T arms 22, at their rear ends, are notched out, as at 24, so as to cooperate with the bracket 20. The bracket 20 is channel shaped in cross section and the vertical portions of the T arms 22 rest thereagainst and is secured in position by the bolts 21, which pass through openings 25 formed in the rear ends of the T arms 22.

In this connection, it may be mentioned that the ordinary bolt 21 used for supporting the bracket 20 to the chassis 11 is not long enough to go through the arm 22 so that I use a longer bolt than the one ordinarily provided.

The notching out of the ends of the arms 22, as at 24, will take care of the bracket 20, as clearly shown in Figure 8 of the drawings.

The notches 24 also permit the nut or bolt 21 to be tightened without interference from the arms 22 themselves.

The arms 22 intermediate of their length have short supporting straps 26 riveted thereto and formed with openings 27. The openings 27 are designed to receive the lower end of the lamp brackets or spindles.

The nut 15, which is part of the lamp bracket assembly, is removed from the screw threaded end of the spindle or support 14 and thereafter the supported strap 26 can be positioned against the underside of the bracket 13 with the screw threaded end of the spindle extending through the opening 27.

The placing of the nut 15 again on the screw threaded end will securely retain the supporting arms in anchored position relative to the chassis 11.

A lock washer 28 can be positioned between the underside of the supporting strap 26 and the nut 15, as clearly shown in Figure 5 of the drawings.

From the construction of the parts just described, it will be seen that the arms 22 are securely fixed to the chassis 11 through the medium of the bolts 21 and the lamp bracket assemblies 13.

The arms 22 project forwardly of the lamp brackets 13 and are provided with a downwardly offset portion 29 which brings the extreme forward ends of the arms at a proper position relative to the wheels of the automobile for supporting a bumper bar.

Fixed to the forward ends of the arms 22 is a bumper bar 30 which may be formed of T iron.

The bumper bar 30 is provided with a number of openings 31 through which bolts 32 extend for fastening the bumper bar to the arms 22.

The bumper bar extends forwardly of the wheels 12 and downwardly from the fenders 18 of the automobile.

The bumper bar has its ends fixed to the fenders 18 by T shaped connections 33. The T shaped connections 33 include a fender strap 34, which is positioned against the underside of the fender 18 and secured thereto by bolts 35.

A leather or felt washer 36 is interposed between the fender strap 34 and the fender 18, as clearly shown in Figure 6 of the drawings.

The cross section of a fender especially used upon Ford automobiles, is curved or crown shaped in cross section and is also provided with ribs 37 running lengthwise of the fender and it is my purpose in providing the fender strap 34 to make it of sufficient length so as to form a complete transverse brace in itself, between one edge of the fender and its other edge.

Pivotally fixed to the fender strap 34 midway between its ends is a connecting strap 38, which is slightly curved and extends downwardly and forwardly from the fender strap 34 and is fixed to the bumper bar by means of the bolt 39.

The connecting strap is formed with a right angled extension or flange 40 which rests against the underside of one leg of the T bumper bar for permitting the bolt 39 to extend therethrough, as clearly shown in Figure 7 of the drawings.

The fender strap 34 and connecting strap 38 are connected together by a rivet 41, which serves as the pivotal connection between the two parts of the connecting member 33, which connects the fender 18 to the bumper bar 30.

The connecting strap 38 is arranged at right angles to the fender strap 34 when the parts are in operative or installed position, as well as being in substantial alignment with the longitudinal center of the fender itself.

The provision of the fender strap 34 enables me to fix it to the fender itself at substantially spaced points, for thereby securing a better connection between the fender and the fender strap and through this medium, a better connection between the fender itself and the bumper bar.

The fender strap 34 can be moved on its pivot 41 to the position shown in solid lines in Figure 4 of the drawings at which time the two parts are in substantial alignment, thus permitting all of the parts of the combination fender brace and bumper to be assembled in a comparatively neat and minimum sized package.

My combination fender brace and bumper structure can be attached to an automobile quickly and easily due to the fact that it fastens to the chassis at places already provided for.

My combination fender brace and bumper embodying the present invention just described, has been in actual commercial use and has proven very efficient for the purpose of bracing fenders relative to the automobile body and at the same time, providing a bumper bar, which helps brace the fenders and protect the automobile as an ordinary bumper, and all of the parts of my structure are manufactured from commercial stock, thereby enabling it to be manufactured and marketed at a reasonable cost.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In combination with an automobile having a pair of fenders, a chassis and lamp brackets secured to the chassis, a combination fender brace and bumper comprising combined supporting and connecting arms fixed to the chassis at one end and to the lamp brackets intermediate of their length, said arms extending forwardly of the chassis of the automobile, a bumper bar secured to the forward ends of said arms and having its ends project beyond said arms, a fender strap secured to the underside of each of said pair of fenders and a connection between each fender strap and the bumper bar.

2. In combination with an automobile having a pair of fenders, a chassis and lamp brackets secured to the chassis, a combination fender brace and bumper comprising combined supporting and connecting arms fixed to the chassis at one end and to the lamp brackets intermediate of their length, said arms extending forwardly of the chassis of the automobile, a bumper bar secured to the forward ends of said arms and having its ends project beyond said arms, a fender strap secured to the underside of each of said pair of fenders and a connecting strap fixed to the bumper bar at one end and to the fender strap at its other end.

3. In combination with an automobile having a pair of fenders, a chassis and lamp brackets secured to the chassis, a combination fender brace and bumper comprising combined supporting and connecting arms fixed to the chassis at one end and to the lamp brackets intermediate of their length, said arms extending forwardly of the chassis of the automobile, a bumper bar secured to the forward ends of said arms and having its ends project beyond said arms, a fender strap secured to the underside of each of said pair of fenders and connecting straps fixed to the bumper bar near each end thereof, said connecting straps having their free ends connected to said fender straps, the fender straps and connecting straps being at right angles to each other.

4. In combination with an automobile havng a pair of fenders, a chassis and lamp brackets secured to the chassis, a combination fender brace and bumper comprising combined supporting and connecting arms fixed to the chassis at one end and to the lamp brackets intermediate of their length, said arms extending forwardly of the chassis of the automobile, a bumper bar secured to the forward ends of said arms and having its ends project beyond said arms, a fender strap secured to the underside of each of said pair of fenders and connecting straps fixed to the bumper bar near each end thereof, said connecting straps having their free ends pivotally connected to said fender straps, the fender straps and connecting straps being at right angles to each other.

5. In combination with an automobile having a pair of fenders, a chassis and lamp brackets secured to the chassis, a combination fender brace and bumper comprising combined supporting and connecting arms fixed to the chassis at one end and to the lamp brackets intermediate of their length, said arms extending forwardly of the chassis of the automobile, a bumper bar secured to the forward ends of said arms and having its ends project beyond said arms, a fender strap secured to the underside of each of said pair of fenders and connecting straps fixed to the bumper bar near each end thereof; said connecting straps having their free ends pivotally connected to said fender straps, the fender straps and connecting straps being at right angles to each other when installed upon an automobile and capable of being in substantial alignment when not installed as and for the purposes stated.

6. In combination with an automobile having a pair of fenders, a chassis and lamp brackets secured to the chassis, a combination fender brace and bumper comprising combined supporting and connecting arms fixed to the chassis on one end and to the lamp brackets intermediate of their length, said arms extending forwardly of the chassis of the automobile, a bumper bar secured to the forward ends of said arms and having its ends project beyond said arms, a fender strap arranged against the underside of each fender and of substantially the same length as the width of the fender, said fender strap being connected to the fender at two points and a connection between the bumper bar and the fender strap.

7. In combination with an automobile having a pair of fenders, a chassis and lamp brackets secured to the chassis, a combination fender brace and bumper comprising combined supporting and connecting arms fixed to the chassis at one end and to the lamp brackets intermediate of their length, said arms extending forwardly of the chassis of the automobile, a bumper bar secured to the forward ends of said arms and having its ends project beyond said arms, a fender strap arranged against the underside of each fender and of substantially the same length as the width of the fender, said fender strap being connected to the fender at two points and a connecting strap secured to the fender strap at the center thereof and extended forwardly and downwardly therefrom, said connecting strap being rigidly fastened to the bumper bar for holding the pair of fenders against movement relative to each other and relative to the chassis independently of each other.

8. In combination with an automobile having a chassis and a pair of fenders, a combination fender brace and bumper comprising a pair of spaced supporting and connecting arms fixed to the chassis, a transverse bumper bar fixed to said arms and extending forwardly of the fenders and a T shaped connection between the ends of the bumper bar and each fender.

9. In combination with an automobile having a chassis and a pair of fenders, a combination fender brace and bumper comprising a pair of spaced supporting and connecting arms fixed to the chassis, a transverse bumper bar fixed to said arms and extending forwardly of the fenders and a T shaped connection between the ends of the bumper bar and each fender, said T shaped connection being formed of two parts pivotally connected together.

10. In combination with an automobile having a chassis and a pair of fenders, a combination fender brace and bumper comprising a pair of spaced supporting and connecting arms fixed to the chassis, a transverse bumper bar fixed to said arms and extending forwardly of the fenders and a T shaped connection between the ends of the bumper bar and each fender, the horizontal bar of the T connection being fixed to the underside of the fender and the vertical bar thereof being fixed to the bumper.

11. In combination with an automobile having a chassis and a pair of fenders, a combination fender brace and bumper comprising a pair of spaced supporting and connecting arms fixed to the chassis, a transverse bumper bar fixed to said arms and extending forwardly of the fenders and a T shaped connection between the ends of the bumper bar and each fender, said T shaped connection being formed of two parts pivotally connected together, whereby the horizontal and vertical bars of the T connection can be swung to position where they are in substantial alignment for shipment and storage.

12. In combination with an automobile having a chassis, a pair of fenders and a pair of lamp brackets, a combination fender brace and bumper comprising combined supporting and connecting members positioned along the sides of the chassis and extending forwardly therefrom, bolts for securing the rear ends of said arms to the chassis, said arms having openings therein to coact with and receive a part of the lamp brackets for anchoring them intermediate of their length, a transverse bar fixed to said arms and a rigid connection between the fenders and the ends of said bar, said connection being T shaped.

13. In combination with an automobile having a chassis, a pair of fenders and a pair of lamp brackets, a combination fender brace and bumper comprising combined supporting and connecting members positioned along the sides of the chassis and extending forwardly therefrom, bolts for securing the rear ends of said arms to the chassis, said arms having openings therein to coact with and receive a part of the lamp brackets for anchoring them intermediate of their length, a transverse bar fixed to said arms, fender straps fixed to the underside of the fenders, connecting straps arranged at right angles to the fender straps, and connecting straps serving to rigidly connect the fender to the bar.

14. In combination with an automobile having a chassis, a pair of fenders and a pair of lamp brackets, a combination fender brace and bumper comprising combined supporting and connecting members positioned along the sides of the chassis and extending forwardly therefrom, bolts for securing the rear ends of said arms to the chassis, said arms having openings therein to coact with and reecive a part of the lamp brackets for anchoring them intermediate of their length, a transverse bar fixed to said arms, fender straps fixed to the underside of the fenders, connecting straps arranged at right angles to the fender straps and pivotally fixed thereto and bolted to said transverse bar as and for the purposes stated.

Des Moines, Iowa, August 14, 1924.

REINHOLD E. LANGE.